US006672015B2

(12) United States Patent
Cognon

(10) Patent No.: US 6,672,015 B2
(45) Date of Patent: Jan. 6, 2004

(54) CONCRETE PILE MADE OF SUCH A CONCRETE AND METHOD FOR DRILLING A HOLE ADAPTED FOR RECEIVING THE IMPROVED CONCRETE PILE IN A WEAK GROUND

(75) Inventor: Jean-Marie Cognon, Sceaux (FR)

(73) Assignee: Menard Soltraitement, Nozay (FR)

( * ) Notice: Subject to any disclaimer, the term of this patent is extended or adjusted under 35 U.S.C. 154(b) by 0 days.

(21) Appl. No.: 09/816,656

(22) Filed: Mar. 26, 2001

(65) Prior Publication Data

US 2001/0045067 A1 Nov. 29, 2001

Related U.S. Application Data

(63) Continuation-in-part of application No. 09/257,020, filed on Feb. 25, 1999, now abandoned.

(51) Int. Cl.$^7$ .............................................. E02D 27/00
(52) U.S. Cl. ........................... 52/169.1; 52/334; 52/600; 52/169.13; 405/36; 405/50
(58) Field of Search ......................... 52/300, 334, 414, 52/600, 301, 169.9, 169.1, 169.13, 170, 292; 405/36, 50, 80, 256

(56) References Cited

U.S. PATENT DOCUMENTS

| 3,087,308 A | * | 4/1963 | Hart et al. ................... 405/36 |
| 3,918,229 A | * | 11/1975 | Schweinberger ............ 52/295 |
| 4,007,568 A | * | 2/1977 | Soble ............................. 52/292 |

(List continued on next page.)

FOREIGN PATENT DOCUMENTS

| AU | 257715 | * | 5/1962 | .............. 52/300 |
| CA | 970124 | * | 7/1975 | .............. 52/300 |
| CN | 1136059 | * | 11/1996 | |
| CN | 1221767 | * | 7/1999 | |
| DE | 3209488 | * | 9/1982 | |
| DE | 3815703 | * | 11/1989 | |
| EP | 992466 | * | 4/2000 | |
| FR | 727543 | * | 11/1931 | .............. 52/300 |
| HU | 54594 | * | 3/1991 | |

(List continued on next page.)

OTHER PUBLICATIONS

"The Behavior and Design of Piled–Raft Foundations Under Lateral Loading", Ninth International Conference on Piling and Deep Foundations, Nice, France, Jun. 3–5, 2002, Presses d l'ecole nationale des Ponts et chausees, pp. 235–240.

"Parametric Analysis of Piled Rafts Founded on a Tropical Clay of Brazil", Ninth International Conference on Piling and Deep Foundations, Nice, France, Jun. 3–5, 2002, Presses d l'ecole nationale des Ponts et chausees, pp. 249–255.

Primary Examiner—Carl D. Friedman
Assistant Examiner—Chi Q. Nguyen
(74) Attorney, Agent, or Firm—Rothwell, Figg, Ernst & Manbeck

(57) ABSTRACT

The invention relates to a device for reinforcing a ground on which is disposed a loading structure, comprising a series of structural inclusions disposed in the ground and adapted to mechanically reinforce said ground, the inclusions having a diameter D comprised between substantially 0.2 m and 0.6 m, two adjacent inclusions being separated by a distance (A) such as $2D \leq A \leq 10 D$, the series of inclusions being made of a material having a Young's modulus of between 500 and 10,000 MPa, a load transmitting layer interposed between the ground and the loading structure, said layer having a Young's modulus less than the Young's modulus of the series of inclusions, a first nominal height between two adjacent inclusions of the series, and a second height less than the first nominal height at locations situated just above the series of inclusions, where the load transmitting layer is plastically compressed by the inclusions which partially penetrate within the load transmitting layer.

2 Claims, 7 Drawing Sheets

U.S. PATENT DOCUMENTS

| | | | | |
|---|---|---|---|---|
| 5,189,859 | A | * | 3/1993 | Payer ........................ 52/585.1 |
| 5,244,304 | A | * | 9/1993 | Weill et al. .................... 404/67 |
| 5,391,226 | A | * | 2/1995 | Frankowski ................ 106/696 |
| 5,689,923 | A | * | 11/1997 | Winkeljann et al. ..... 52/223.13 |
| 5,852,077 | A | * | 12/1998 | Zawada et al. ................. 524/8 |
| 5,950,680 | A | * | 9/1999 | Randall ........................ 52/300 |
| 5,992,123 | A | * | 11/1999 | Kies ............................ 52/719 |
| 6,042,301 | A | * | 3/2000 | Sovran ........................ 405/112 |
| 6,143,069 | A | * | 11/2000 | Brothers et al. ............ 106/678 |
| 6,161,352 | A | * | 12/2000 | Frohlich ...................... 52/300 |
| 6,178,710 | B1 | * | 1/2001 | Colalillo ...................... 52/310 |
| 6,309,143 | B1 | * | 10/2001 | Merjan et al. .............. 405/253 |
| 6,332,303 | B1 | * | 12/2001 | Saito ........................ 52/741.14 |
| 6,474,030 | B1 | * | 11/2002 | Ueda ............................ 52/292 |

FOREIGN PATENT DOCUMENTS

| | | | |
|---|---|---|---|
| JP | 60151263 | * | 8/1985 |
| JP | 61236641 | * | 10/1986 |
| JP | 05306156 | * | 11/1993 |
| KR | 9710343 | * | 6/1997 |
| PL | 176139 | * | 8/1994 |
| WO | 9512050 | | 5/1995 |
| WO | WO 2000027774 | * | 5/2000 |

* cited by examiner

CONCRETE PILE MADE OF SUCH A CONCRETE AND METHOD FOR DRILLING A HOLE ADAPTED FOR RECEIVING THE IMPROVED CONCRETE PILE IN A WEAK GROUND

CROSS REFERENCE TO RELATED APPLICATION

This application is a continuation-in-part of application Ser. No. 09/257,020, filed Feb. 25, 1999, now abn, the disclosure of which is incorporated by reference.

FIELD OF THE INVENTION

The invention relates to improvements in a ground, and possibly thereover, especially a weak ground such as a clay.

BACKGROUND OF THE INVENTION

Various types of foundations are already known for erecting facilities, buildings, and supermarkets or for obtaining an embankment for a highway, for example.

It is especially known to dispose piles in the ground above which the building is erected. However, it is traditionally required to dispose a network of structural inclusions (beams, piles, etc.) made of a traditional reinforced concrete for supporting the floor of the building, or the road. If the piles are disposed in a mechanically weak ground, the strength induced by the building is typically essentially transmitted by the piles to a harder portion of the ground. Thus, substantially no charge of the building is transmitted to the weak ground.

It is to be noted that, in the present description, a ground is considered as weak if its modulus of elasticity (E), also called Young's modulus, is less than about 8 to 9 MPa. A series of so-called ballasted columns is sometimes used in such a situation. Typically, such ballasted columns are wells dug into the ground and having a diameter between about 0.5 m and 1.20 m. The wells are filled with stones or a mixture of sand and gravel having dimensions typically comprised between 10 mm and 60 mm.

If the ground is too weak (e.g. the modulus of elasticity of the ground is less than about 5 MPa), such columns often break off, if a quite high building is erected thereon. Embedding rigid inclusions within the ground is another solution. Such rigid inclusions are piles having a small diameter. The distance between two piles is typically between about 1.50 m and 2.50 m. The piles are either micropiles including a metallic tube, or full piles made of a traditional concrete. But the stiffness is then typically too high to share the loads between the soil and the inclusions.

The equivalent stiffness of a network comprising such rigid inclusions is very high. Then, more than 95% of the charge is transmitted to the piles, and only 5% is transmitted to the weak ground.

DESCRIPTION OF THE RELATED ART

A ground displacement auger head adapted for making inclusions in a ground is known from WO-A-95/12050 in which the auger head comprises a tip, a displacement body having at least over a lower portion a core diameter increasing in a direction away from said tip, and at least one screw flange extending at least over said lower portion of the displacement body, the auger head being characterised in that the screw flange has a pitch which increases at least over said lower portion of the displacement body in the direction away from the tip.

In WO-A-95/12050, a main object is to present an auger head by which the ground can be displaced more efficiently, requiring less energy during screwing in, and which allows also to screw through more resistive, in particular more sandy, layers of ground.

Another drill is described in EP-B-228 138 in which the object is to avoid that a high resistance be encountered during screwing into the ground. To that end, the tubular screw drill described in EP-B-228 138 comprises a screw fin (also called screw flange) and is characterised in that said screw fin extends between an end of the drill and a displacer which consists successively of a first closed spiral part having the same screw direction as the fin, and a second closed spiral part having the opposite screw direction.

In the present invention, it is considered that the drills of the prior art, and especially the above-mentioned drills, have drawbacks including a too high resistance still encountered during forcing the drill in the ground.

SUMMARY OF THE INVENTION

So, an object of the invention relates to a system having an improved efficiency for reinforcing a ground on which is disposed a loading structure, such as a building.

A further object is to dispose in the ground inclusions having a modulus of elasticity (E) substantially equal to the modulus of elasticity of the so-called ballasted columns, but which do not weak off so often.

Another object of the invention is to offer an improved concrete material having a modulus of elasticity (E) less than a traditional hard concrete, so that a structure made of such an improved concrete does not systematically concentrate all the strengths in the inclusions.

A further object relates to an improved drill adapted for digging an annular hole in a ground, and for providing said hole with a concrete or a structural material.

Another object refers to an improved ground displacement auger head adapted for drilling a hole in a structure.

The first object of the invention is achieved through a device for reinforcing a ground on which is disposed a loading structure, such as a building, the device comprising:

a series of structural inclusions disposed essentially vertically within the ground and adapted to mechanically reinforce said ground, the series of inclusions having an external diameter (D) comprised between substantially 0.1 m and 0.8 m (preferably 0.2 m and 0.6 m), and two adjacent inclusions being separated in the ground by a distance (A) such as 2D $\leq$ A $\leq$ 10 D, said series of inclusions being made of a material having a Young's modulus (long term) comprised between 500 and 10,000 MPa, and preferably between 1,000 and 10,000 MPa, a load transmitting layer interposed between the ground and the loading structure disposed thereon, for transmitting and distributing the load from the loading structure to both the ground and the series of inclusions, the load transmitting layer having:

a Young's modulus less than the Young's modulus of the series of inclusions (viz. of every inclusion of said series), a first nominal height between two adjacent inclusions of said series of inclusions, and a second height less than the first nominal height at locations situated just above the series of inclusions, where the load transmitting layer is plastically compressed by the series of inclusions which partially penetrate within said load transmitting layer.

In the instant description and claims, it is considered that:

D is indifferently either an external diameter of one inclusion of the series of inclusions, or the external diameter of the cylinder having the same volume as one inclusion of said series, A is indifferently either the horizontal distance between two adjacent inclusions of the series, or the length of one side of a square equivalent to said distance between two adjacent inclusions in the ground, 10 bars=1 MPa all the values in the present text are given to within 10%, "Modulus" are long term modulus (a few days or weeks, at least) as opposed to immediate modulus calculated immediately after the load has been applied to the corresponding structure, a (structural) inclusion is an essentially vertical, elongated structure adapted to mechanically reinforce a ground, especially a weak ground. An inclusion can be made of different types of materials, such as aggregates of stones, mortar, specific concrete (especially concrete having a low modulus of elasticity, as abovementioned). The inclusions can be annular tubes or parallelepiped piles. Their section can be rounded or parallelepiped. If the (external) section is rounded, it is considered that the corresponding inclusions have an (external) diameter. The inclusions can be either hollow (such as annular piles) or full of material.

According to another feature of the invention, the device for reinforcing the ground comprises:

a series of structural inclusions disposed within the ground and adapted to mechanically reinforce said ground, a load transmitting layer interposed between the ground and the loading structure disposed thereon, for transmitting and distributing the load from the loading structure to both the ground and the series of inclusions, the load transmitting layer having a Young's modulus less than the Young's modulus of the series of inclusions, wherein:

($E_i$) being the Young's modulus of (one of) the inclusions, and ($E_c$) being the Young's modulus of the load transmitting layer:

if $D \leq 0.3$ m, then 5,000 MPa$\leq E_i \leq$12,000 MPa, if $D \leq 0.3$ m, then 500 MPa$\leq E_i \leq$10,000 MPa, and $E_c \leq$80 MPa.

In accordance with the aspect of the invention relating to an improved concrete adapted to be used for manufacturing the so-called "inclusions", it is proposed that such a concrete consists of an aggregate comprising, in dry weight and for obtaining 1 m³ of aggregate:

between substantially 100 kg and 400 kg of cement and/or lime, between substantially 10 kg and 50 kg of an elastic substance, between substantially 500 kg and 1,800 kg of flying ashes and/or sand.

With such a dry powder, it should be possible to obtain a concrete having a long term modulus of elasticity (E) comprised between about 1000 to 2500 MPa, for an ultimate compression strength comprised between substantially 2 and 12 MPa.

Traditionally, the (long-term) modulus of elasticity (E) and the strength $\sigma_j$ (both in MPa) of a concrete are estimated as follows:

$E=\frac{1}{2} \times 11.000 \ (\sigma_j)^{1/3}$ ($\sigma_j$ is the strength of the concrete, j days after having made it).

Preferably, the abovementioned elastic substance is obtained from a powder of rubber, and the granulometry of said substance is preferably comprised between about 0.08 mm and 2.5 mm, while preferably including between about 30% to 70% of grains (or granulars) comprised between 0.5 mm and 1.8 mm, and about 70% to 30% of grains comprised between 0.15 mm and 0.5 mm. Of course, a mixing agent (typically water) will be used to make the mixture and obtain a ready-to be used concrete.

Another object of the invention is an improved "inclusion", such as a pile, adapted to be disposed especially in a weak ground and made of a semi-rigid material, so that:

$$100 \ E_s \leq E_y \leq 1000 \ E_s,$$

with ($E_y$) being the Young's modulus of both the load transmitting layer and the series of (all the) inclusions, and, with ($E_s$) being the Young's modulus of the ground to be reinforced.

The invention also refers to a method for disposing the inclusions of the above series in the ground to be reinforced, as follows:

a drill is screwed in the ground for lowering it in said ground and digging in the ground a shape corresponding to the shape of an individual inclusion, while pushing the ground material forced (or pressed back) by the drill, into the surrounding ground, then, the drill is unscrewed, or pulled out while still screwed, for bringing it up to the ground surface again, and the space in the ground, released by unscrewing, or extracting, the drill and forcing the ground material, is provided with the material in which the inclusion is to be made of, through the drill.

According to a further feature, the drill is preferably hollow for obtaining a series of annular inclusions.

According to the invention, a drill adapted for digging an annular hole in a ground, and for providing said hole with the material in which the inclusion is to be made of, preferably comprises:

a central tube having an axis, a top end portion and a bottom end portion, a first helical blade axially arranged around the top end portion of the central tube, a second helical blade axially arranged around the bottom end portion of the central tube, the second helical blade having a diameter larger than the first helical blade, a lining partially arranged around the first helical blade, and extending axially beyond said first helical blade, the lining comprising a double-walled portion defining an inner chamber in fluid communication with a duct crossing the first helical blade, said duct being in fluid communication with the central tube, for injecting therein the concrete, a third helical blade arranged around the lining, a movable trap closing an opening of said inner chamber of the lining, said trap being adapted to be opened for allowing the concrete to fill the annular hole.

As above-mentioned, it is a further object of the invention to improve the penetration of a drill within the ground, said drill being notably adapted to be used for "creating" the so-called "structural inclusions" (which can be as hollow-viz. annular as solid-viz. completely full of material). It is further intended to get a so efficient compression of the ground when screwing the drill that the pulling out thereof is especially easy and no inverted upper screwing flange at the upper section of the drill is required. Furthermore, unscrewing is useless when pulling out the drill.

Another object is to reduce the torque required for moving the drill within the ground and to enable said drill to more easily penetrate through a highly (mechanically) resistive ground. To that end, it is proposed a drill comprising a core having:

an axis, an end provided with a front drilling head adapted to be forced in the soil at the first, and a convex external lateral surface from which a series of blades project, radial to the axis, the blades having a length substantially parallel to the axis.

A complementary object of the invention is to optimise both the penetration of the drill and the lateral compression of the ground (ground displacement). To that end, the blades of the drill of the invention are preferably helically wound in an helix round the axis of the core and individually have a length parallel to the core axis.

A further object of the invention is to improve the progressive destructuration of the ground in proportion as the drill is pushed in the ground. To that end, the blades of the drill of the invention preferably project from said convex external lateral surface of the core on a width which increases as the axial distance of a determined blade of said series and the front drilling head increases.

Another object of the invention is to provide blades which improve the above-mentioned effect of destructuring the ground, while being easy to manufacture, at a low cost. To that end, at least some of the blades have a step for having their width varied, so that said blades individually have a lower section having a width lower than the width of a higher section, said lower section being axially located closer from the front drilling head than the higher section.

For optimising the effect of destructuring the ground, the width of each section of the blades section increases from one blade of said series to another blade, as the axial distance between a determined blade of said series and the front drilling head increases. During the drilling operation, the drill has preferably to be precisely screwed in the ground. For having the drill precisely directed in the ground:

in the immediate vicinity of the front drilling head of the drill according to the invention, the core is provided, on its convex external lateral surface, with at least one screw flange wound round the core axis, and said at least one screw flange axially extends along the core on a predetermined distance (for example comprised between half-a-turn and two turns), so that the blades are axially located apart from the front drilling head, the screw flange(s) being axially interposed between the front drilling head and said series of blades. So, at the lower section of the drill, the blades are protected and, at the lower end (screw flange section), the ground is only destructured before being preferably decompressed, and then progressively laterally displaced by the blades.

A further object of the invention is to have the global costs reduced with no alteration of the performance of the drill. To that end, one of the above-mentioned screw flange(s) can extend round the core on a longer distance (preferably at least three or four turns), the series of blades of the drill extending then parallel to the core axis, between a first and a second sections of the screw flange (i.e. between two adjacent turns thereof) So, a tubular screw drill according to the prior art, having at least one screw fin, or screw flange, can be basically used, while being provided with said series of ground destructuring blades of the invention.

Another object of the invention is to optimise the lateral displacement of the ground when screwing the drill. To that end, the blades preferably begin, at a lower end thereof, at an axial distance from an upper end of said at least one screw flange, so that an open space is interposed between the blades and said at least one screw flange. Said open space allows the ground to be destructured by the lower screw flange(s) to be decompressed before being laterally displaced (or compacted) by the blades. It is to be understood that said open space is an intermediate zone located round the external surface of the core free of any blades or screw flange.

A further object of the invention is to provide an efficient obturator at the lower end of the drill, near the drill head. Typically, such a drill comprises an axial bore provided through the tubular core thereof, said axial bore having a lower, opened end. Often, in the drills of the prior art, the obturators provided for opening or closing said lower, opened end comprise either a drilling tip or a simple plate which are abandoned at the bottom of the drilling, when the drill is finally pulled upwardly, and the concrete (or any other material, such as a mortar) is injected into the drilled hole. Such solutions are expensive and providing the drill with such an obturator each time the operator has to screw the drill in the ground incurs a loss of time. For avoiding such drawbacks, the drill of the invention preferably comprises an axially movable skid permanently attached to the core and located at the lower end thereof, the movable skid preferably comprising an angulated, splayed out wall adapted for engaging an angulated splayed out wall located at the lower, opened end of the axial bore, so that a valve is defined at said end, and a torque can be efficiently transmitted to the skid (when it engages the core) Furthermore, the movable skid is preferably pendularly attached to the tubular core, and has a front ground deflector. Such a pendular skid gives the operator an indication of how the drill is positioned in the ground. Further, the skid is a self-direct closing system and the drill is pushed into the ground. The skid is self-centering. Furthermore, if the splayed out walls of the skid and the tubular core, respectively are V-shaped, the hollow section at the lower, opened end of the bore for allowing the concrete, or mortar is maximum while the deflection of said flow is minimum.

BRIEF DESCRIPTION OF THE FIGURES

A more detailed description is given below, with reference to the Figures, in which.

DETAILED DESCRIPTION OF THE INVENTION a) An Improved Concrete

As abovementioned, the invention relates to an improved concrete having a low modulus of elasticity E (also called Young's modulus). Using an elastic, or rubbery, material to be incorporated in a traditional concrete, reduces the modulus of elasticity of such a traditional concrete, without notably reducing the strength of the resulting concrete in the same proportion. Thus, incorporating such a rubbery material in a traditional concrete will induce a long-term modulus of elasticity E comprised between about 1000 to 2500 MPa, for an ultimate compression strength comprised between substantially 2 and 12 MPa. The above-disclosed concrete is adapted for obtaining such a result.

According to a specific embodiment, said specific concrete can be composed as follows (it is to be noted that the following composition is for obtaining 1 m³ of powdered concrete, excluding water). So, the composition in dry weight is as follows:

1.) Including incorporated fly ash:

fly ash: 600 kg to 1,200 kg cement (and/or lime): 150 kg to 280 kg powder of rubber: 10 kg to 50 kg 2.) Incorporating a powder of sand:

sand (having a granulation of about 0.8 mm to 4 mm): 800 kg to 1,600 kg, cement (and/or lime): 150 kg to 300 kg powder of synthetic rubber: 10 kg to 50 kg.

For obtaining the abovementioned results, the granulation of the rubber will be comprised between 0.15 mm and 1.8 mm, including 40% to 60% of granulates comprised between 0.5 mm and 1.8 mm and 60% to 40% of granulates comprised between 0.15 mm and 0.5 mm. Any other material having an elasticity comparable with the elasticity of the rubber could be used. Whatever it may be, such an elastic concrete can be especially used for erecting piles adapted for supporting a structure to be built over a ground, and especially a ground having a weak mechanical strength, such as a weak clay.

b) Creating Vertical Structural Inclusions in a Weak Ground

Figure 1:
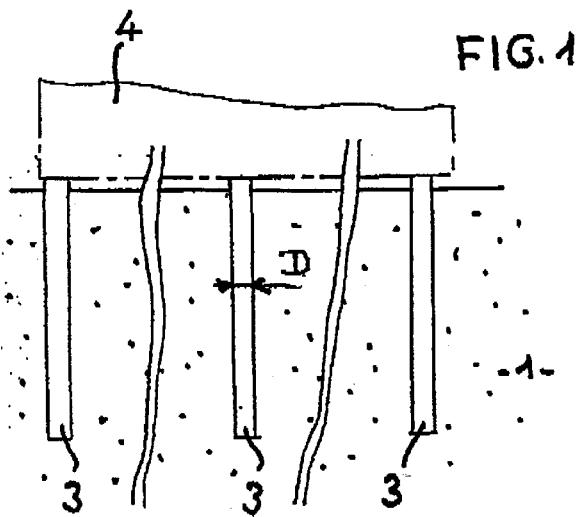
FIG. 1 diagrammatically shows a section of ground including piles for erecting a structure on the ground.
Figure 2:
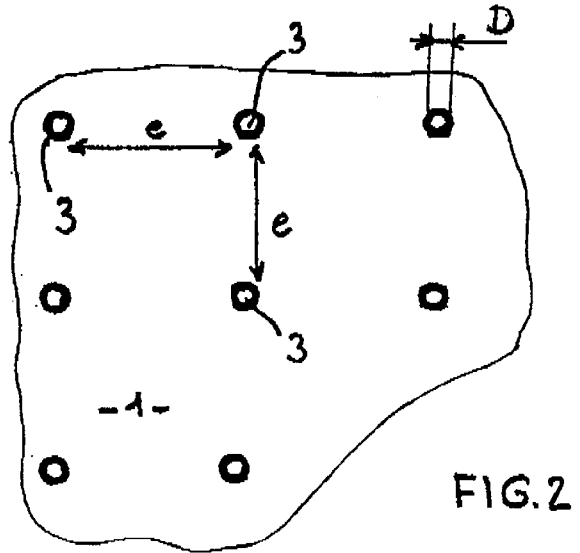
FIG. 2 is a view from the above of the ground illustrated in FIG. 1.
Figure 6:
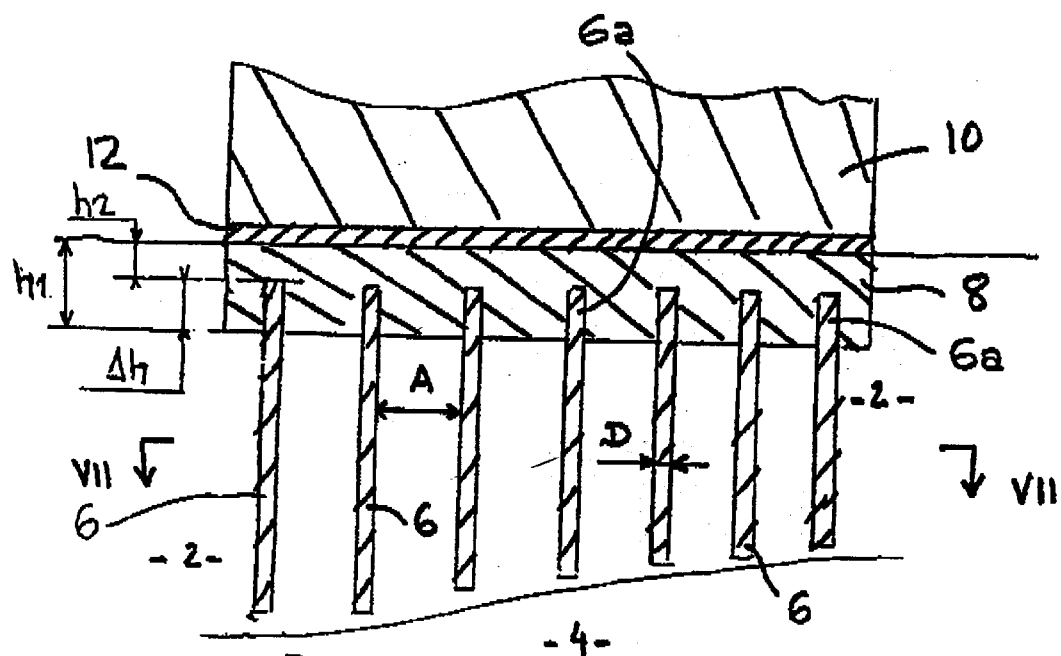
FIG. 6 is a vertical, cross sectional view of a loading structure erected over a load transmitting layer distributing the load to a series of vertical semi-rigid inclusions embedded in the ground.

According to the invention, a ground is considered as weak if its modulus of elasticity is less than about 8 to 9 MPa (and typically comprised between 0.5 and 8 MPa). In such a weak ground referenced as 1 in FIG. 1, supporting piles 3 which can be made of the so-called low modulus concrete are vertically disposed. As illustrated in FIG. 2, the piles 3 are regularly distributed in the ground 1. The piles 3 are preferably cylindrical and have a circular section. They could be parallelipipedic and elongated in one direction (vertical). The external diameter (D) of the piles is preferably comprised between 20 cm and 60 cm and the piles are distributed in the ground so that the distance (A) therebetween is two to ten times (preferably three to five times) greater than the external diameter (D). Above the mesh of piles 3, a "loading structure" 4 is to be erected.

c) A System According to the Invention for Reinforcing a Ground on which is Disposed a Loading Structure, such as a Building As illustrated in FIG. 6, a weak ground (or layer) 2 is to be mechanically reinforced. The weak ground 2 extends over a mechanically resistant ground 4. For reinforcing the weak ground 2, a series of essentially vertical elongated inclusions 6 are disposed in the weak layer 2. Preferably, the series of inclusions 6 are regularly distributed in the zone of ground to be reinforced, preferably according to a network having a triangular or rectangular (square) mesh. Every inclusion of the series has a dimension D (FIGS. 6 and 7) comprised between 0.1 m and 0.8 m, and preferably between 0.2 m and 0.6 m. Further, two adjacent inclusions are separated, in the zone 2, by an horizontal distance A such as $2D \leq A \leq 10D$. The material the inclusions are made of can be the elastic concrete disclosed in a). Preferably, the material of the inclusions will have a (long term) Young's modulus comprised between 1000 and 10,000 MPa, so that the inclusions are semi-rigid structural inclusions having a Young's modulus notably lower than the Young's modulus of rigid inclusions made of a hard concrete (Young's modulus of about 150,000 bars, long term).

Another material adapted to be used for such semi-rigid inclusions is a mortar having a low compression strength (less than 1.5 MPa, Rc 28), the elasticity modulus of which is 1.5 to 10 times, preferably 3 to 5 times, lower than the Young's modulus of a hard concrete (15,000 MPa, typically).

Above the series of inclusions 6 is disposed a load transmitting layer 8 made of a material which can be partially punched by the inclusions. So, even if the upper end 6a of the inclusions does not penetrate the load transmitting layer when said layer is just created above the inclusions, said inclusions punch the layer 8 a moment later (few weeks) because of the weight of the loading structure 10 disposed above (see FIG. 6). As illustrated, a floor (such as a paving, a foundation raft or a ground sill) 12 is interposed between the load transmitting layer and the loading structure 10. Typically, the load-transmitting layer 8 is made of a granular compacted fill (selected from sand to gravel) with or without addition of cement or an equivalent binder. The function of the layer 8 is to transmit and distribute the load from the loading structure 10 to both the ground 2 and the series of inclusions 6. The Young's modulus of the load-transmitting layer 8 is less than the Young's modulus of the series of inclusions 6. Further, as explained above, when the loading structure 10 is disposed on the layer 8, said layer has a first nominal height $h_1$ between two adjacent inclusions 6 of the series, whereas it has a second vertical height $h_2$ less than the first nominal height $h_1$ at locations situated just above the series of inclusions, where the load transmitting layer has been plastically compressed by the inclusions which now partially penetrate within the layer 8.

In relation to the above, it is well known that:

$$E_y = \frac{\sigma_i}{\frac{\sigma_i}{E_i} + \frac{\Delta h}{L}}$$

with $E_y$ being the cumulative Young's modulus of both the load transmitting layer 8 and the series of inclusions 6, with $E_i$ being the mean Young's modulus of (one of) the inclusions 6, with $\Delta h$ being the penetrating height of the inclusions 6 within the load transmitting layer 8 further to the plastic compression thereof ($\Delta h = h_1 - h_2$), and with $\sigma_i$ being the strength of compression within the series of inclusions 6 further to the penetration of the inclusions within the load transmitting layer.

Further to tests made in relation to the invention, it has been noted that preferably $E_y \leq 1000\, E_s$, with $E_s$ being the Young's modulus of the ground 2 to be reinforced, so that the ground supports between 20 to 50% of all the load transmitted by the loading structure 10. Most preferably $100\, E_s \leq E_y \leq 1000\, E_s$.

Figure 7:
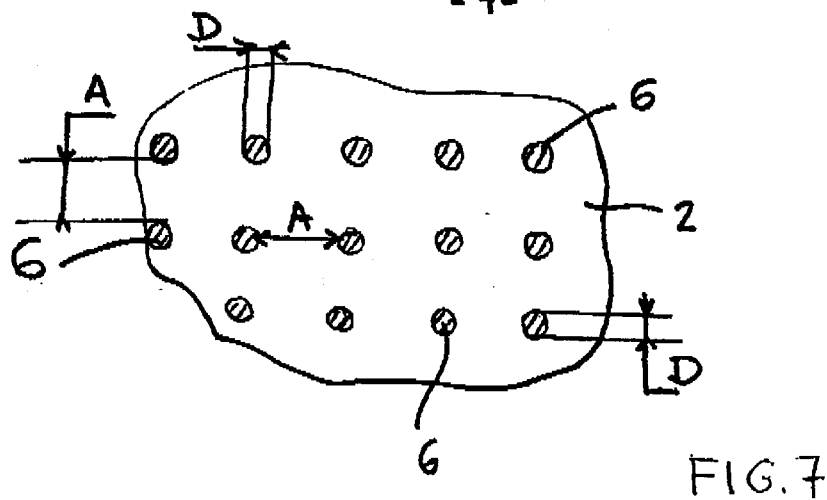
FIG. 7 is a plan view along the arrow VII of FIG. 6 (partially showing the inclusions, only)

In relation to the above and to what is illustrated in FIG. 7, let us consider that:

$$0.1\,m \leq (D) \leq 0.8\,m \text{ and}$$

$$2D \leq A \leq 10D.$$

According to other tests made in relation to the invention, it is further recommended that:

if $D \leq 0.3\,m$, then $5{,}000\,MPa \leq E_i \leq 12{,}000\,MPa$, if $D \leq 0.3\,m$, then $500\,MPa \leq E_i \leq 10{,}000\,MPa$, and $E_c \leq 80\,MPa$.

($E_c$) being the Young's modulus of the load transmitting layer 8.

Such a distribution of semi-rigid structural inclusions having such mechanical and dimensional features improves the sharing of the load exerted by the loading structure between the ground 2 and the series of inclusions 6. If the above-mentioned distribution A of the inclusions in the ground, together with the D reference are respected, it is further recommended for the efficiency of the reinforcing to be obtained, that:

$$0.3\,m \leq h_1 \leq 1.5\,m, \text{ and}$$

$$D_{60}/D_{10} \leq 6,$$

with $D_{60}$ being the sieve diameter corresponding to 60% passing in the ASTM Standard sieve analysis, and $D_{10}$ being the sieve diameter corresponding to 10% in the same ASTM Standard.

d) A First Embodiment of a "Full" Drill

Figure 3:
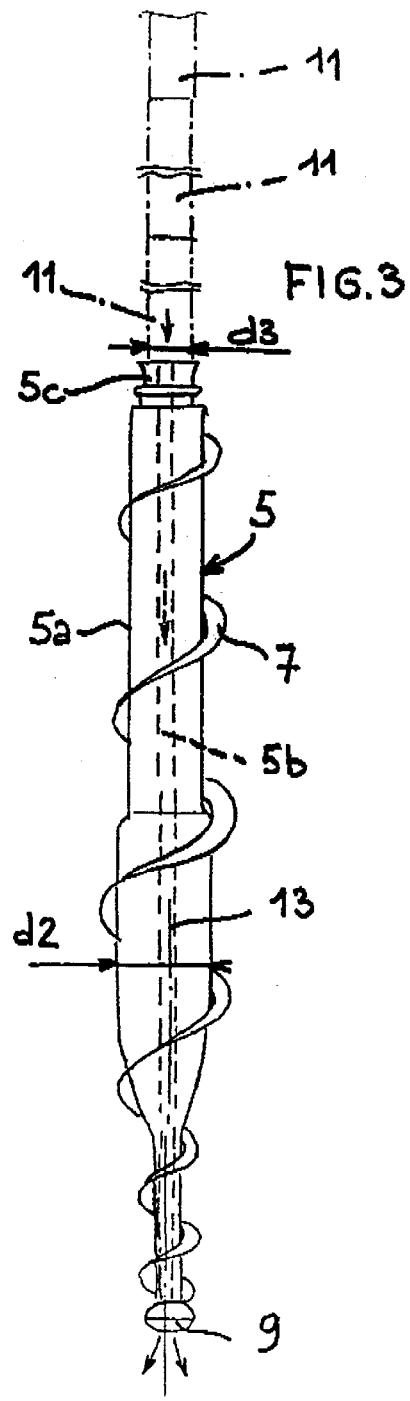
FIG. 3 is a diagrammatic view of a first embodiment of a drill adapted to be used according to the invention.

As illustrated in FIG. 3, a full drill 5 can be used for disposing piles in the ground. The drill 5 is a cylindrical tube having an axial helical rib 7 around its outer surface 5a. The bottom end 5b of the drill is provided with a movable trap 9. The top end 5c of the drill is connected to a series of tubes 11 connected end to end for controlling the screwing of the drill along its longitudinal axis 13. Operating means (not illustrated) are connected to the series of tubes 11 for moving the tubes and the drill around the axis 13. Typically, the diameter $d_2$ of the drill is larger than the diameter $d_3$ of the tubes 11.

The operation of the drill is preferably as follows: A drill is vertically disposed just above a zone of weak ground to be reinforced. A drill is screwed into the ground and the tubes 11 are successively connected end to end, while the drill 5 penetrates into the ground. It is to be noted that the drill 5 does not induce an extraction of (or does not expel from the ground) the ground material moved by the helical rib 7. On the contrary, said swept back ground material is forced into the surrounding ground which, thus, is compacted. At a predetermined depth in the ground 1, the drill 5 is stopped. Then, the drill is unscrewed from the ground and the abovementioned low modulus concrete is injected into the drill, through the series of hollow tubes 11. The pressure of said concrete which circulates into the inner axial duct 5b of the drill, ejects (or opens) the trap 9 and progressively fills the hollow space liberated by unscrewing the drill. The diameter of the full pile 3 so obtained is such that $(D) \cong d_2$. However, in many cases, obtaining a series of hollow, essentially vertical inclusions in the ground is preferable.

e) An Embodiment of a "Hollow" Drill

Figure 4:
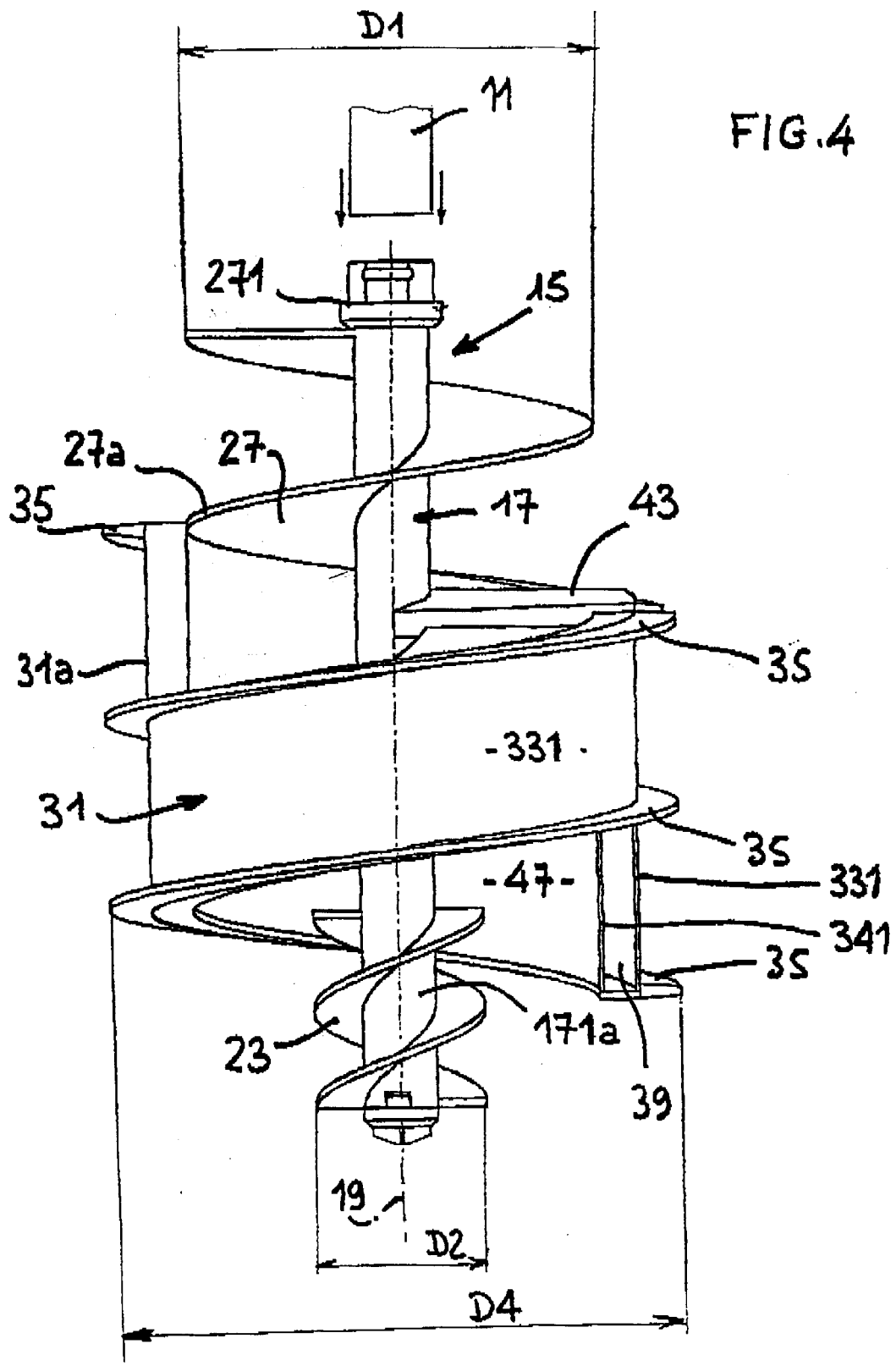
FIG. 4 is an external view of the second embodiment of a drill.
Figure 5:
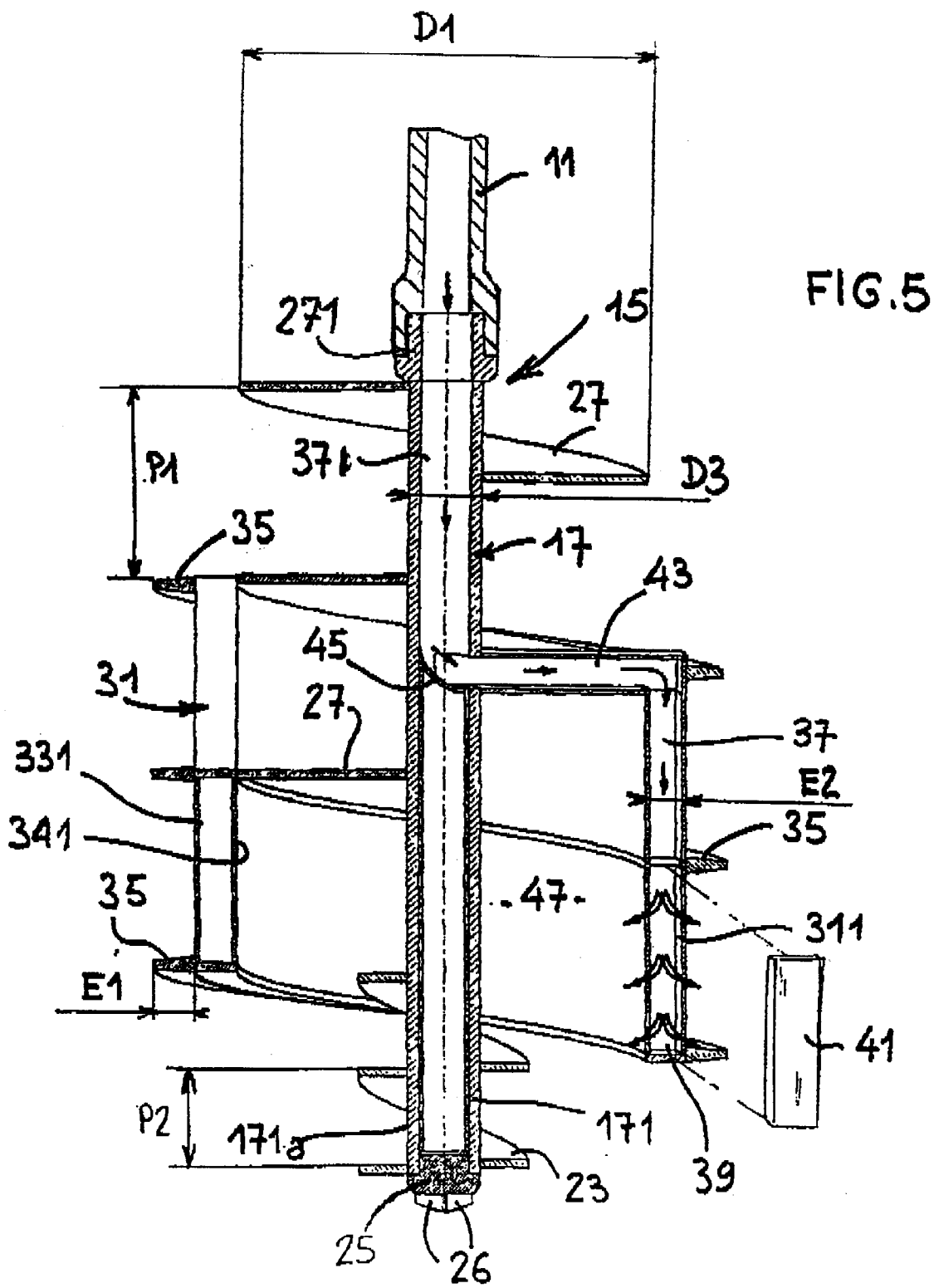
FIG. 5 is a longitudinal section of the drill illustrated in FIG. 4.

The drill 15 illustrated in FIGS. 4 and 5 is a hollow drill. Such a hollow drill comprises a central hollow tube 17 having a longitudinal axis 19 (generally vertically disposed). The central tube 17 comprises a bottom end 171 around the outer surface 171a of which is disposed a helical rib (or blade) 23. At the bottom, the free end of the tube 17 is closed by a plug 25 provided with sharp and hard tooth 26 for digging the ground. Above the helical rib 23 is disposed a larger helical rib 27 which extends axially up to the top end 271 of the tube 17, therearound. The pitch P1 of the helical screw 27 is substantially two times larger than the coaxial pitch P2 of the bottom helix 23, and the external diameter D1 of the screw 27 is substantially three times larger than the external diameter D2 of the helix 23. The central hollow tube 17 has a diameter D3 which is substantially half the diameter D2. One pitch after the top end 271 of the tube 17, the helix 27 is equipped with a peripheral lining element 31 extending longitudinally (parallel to the axis 19) at the periphery of the helical rib 27, and even beyond. Such a lining closes the outer surface 27a of the helix 27. So it has an helical shape.

For screwing and unscrewing the drill, the outer surface 31a of the lining is provided with an helical extension 35. The extension 35 radially extends (outwardly) the transverse wall of the helix 27 and the two helices (27, 35) have consequently the same pitch P1 and are in phase. The diameter D4 of the most external helical blade 35 is about three times D2. The peripheral helical lining 31 longitudinally extends closer to the helix 23 than the helix 27 does: the helix 27 stops one pitch above the helix 23, whereas the peripheral lining 31 stops around the first upper pitch of the helix 23. Typically, the helix 27 has two turns, whereas the helical lining 31 and the external helical extension 35 thereof have two turns and a half. Upwardly, the lining 31 and its helical extension 35 begins at the end of the first turn of the helix 27. The bottom end of the helix 27 is longitudinally disposed at the middle of the external outward helix 35. The bottom end of said outward helix 35 is disposed substantially at the end of the first upper pitch of the lower central helix 23. Further, between the level of the one and a half turn of the helix 27 (the reference is the top of the helix) and its bottom end (end of helix 35), the lining 31 is a double-walled lining comprising an outer wall 331 and an inner wall 341 defining an inner chamber 37 therebetween. At its bottom free end 311, the helical lining 31 has an opening 39 which is in fluid communication with the chamber 37. In operation, the opening 39 is closed by a trap 41 (FIG. 5). Upwardly (at its top end) the chamber 37 is further in fluid communication with a radial duct 43 extending transversal to a local portion of the helix 27 for connecting the chamber 37 and the inner space 371 of the central tube 17. So, the chamber 37 is in fluid communication with the central hole 371, through the radial conduit 43. At the level of the conduit 43, the bottom end of the axial inner space 371 is closed by a transversal plate 45 having a curved shape. With such an arrangement, the drill 15 has an annular cavity 47 interposed between the inner tube 17 and the outer lining 31. The diameter of said annular space 47 (the shape of which is an helix) is D1–D3 (except at the level of the helix 23). The length of the annular space 47 is presently 2.5×P1. Whereas the top of the annular space 47 is vertically closed by a portion of the helix 27, its bottom is completely opened, as illustrated in FIG. 4 or 5. At the top end 271 thereof, the tube 17 is adapted to be coaxially connected to one tube of the abovementioned tubes 11.

Figure 8:
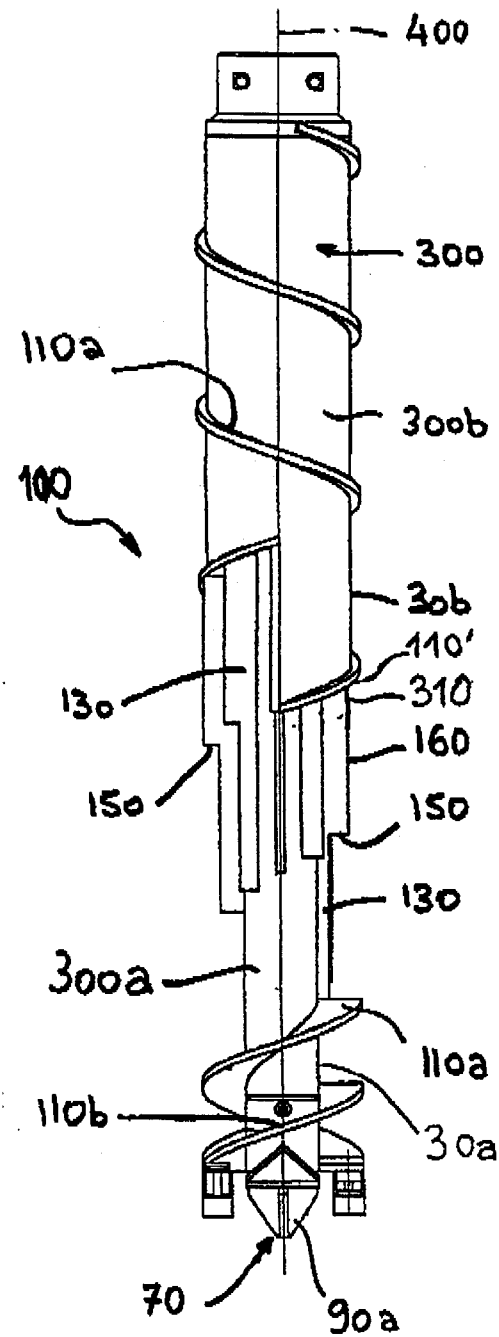
FIGS. 8 and 9 are side views of a third embodiment of a screw drill according to the invention, in a first position where the distal valve is closed (FIG. 8) and in a second position where said valve is opened (FIG. 9)

The operation for digging a well in the ground 1 with the drill 15 is preferably as follows. The drill 15 is vertically screwed into the ground 1. The larger diameter of the drill (D4) (external diameter of the helix 35) can, for example, be of about 70 cm to 150 cm, while the operative inner diameter of the drill (D1) will then be typically comprised between 55 cm and 140 cm. The radial length E1 of the helical blade 35 is typically between 6 cm and 10 cm and the radial thickness E2 of the chamber 37 (including the thickness of the wall 331, 341) is typically between 5 cm and 15 cm. So, the thickness of the annular space created into the ground 1 by screwing the drill 15 will be of about 5 cm to 15 cm. At a predetermined depth in the ground, the drill 15 is stopped. The removal of the drill is operated by unscrewing it. While unscrewing the drill, the appropriate material, and especially the abovementioned low modulus concrete of the invention is injected through the series of hollow tubes 11 and then through the inner space 371 of the tube 17. The pressure of injection directs the material in the chamber 37, through the duct 43, as illustrated by the arrows in FIG. 5. At the end 311 of the chamber, the material pushes the plug 41 and throws into the annular space created by the drill in the ground. So, said annular space is progressively filled by the material from the bottom of the well to the ground level. It is to be noted that the drill 15 forces the ground material into the ground and does not push it outside, over the ground level. So, screwing and unscrewing the drill induces a compacting effect in the ground, around the dug well. Of course, the concrete injected in the hole drilled in the ground according to anyone of the above described embodiments is allowed to harden in said ground and the corresponding pile (semi-rigid inclusions especially) is so maintained in the ground for supporting any structure built thereon.

f) A Second Embodiment of a "Full" Drill, Adapted to be Used as a Ground Displacement Auger Head for Making Structural Inclusions (Especially Semi-rigid Inclusions) in a Ground which is to be Mechanically Reinforced In FIG. 8, is illustrated a screw drill, also called ground displacement auger head, referenced 100. The drill 100 is an element of a screwing apparatus adapted for obtaining a compaction grouting or making inclusions of concrete or mortar, for example, so that piles are erected in-situ in the ground to be reinforced (especially the so-called "weak ground"). Such a drill is typically disposed at the bottom of a vertical mast operated by an auger motor used for lowering in the ground, or elevating from the drilled hole, the auger head 100.

Typically, a hole is drilled as follows (as explained in WO-A-95/12050:
  a hollow drill (such as the drill 100) is forced (screwed) in the ground to be reinforced by a concrete, engagement of the drill in the ground induces a lateral displacement of the ground surrounding the drill,
  a concrete(or a mortar) is injected in the hole, through the drill, while said drill is removed from the hole (pulled back) by an extractor disposed on the drilling apparatus, for example. Preferably, the drill is rotated while being pulled back, so that the direction of screwing rotation of the drill is maintained while the drill is upwardly removed.

Figure 9:
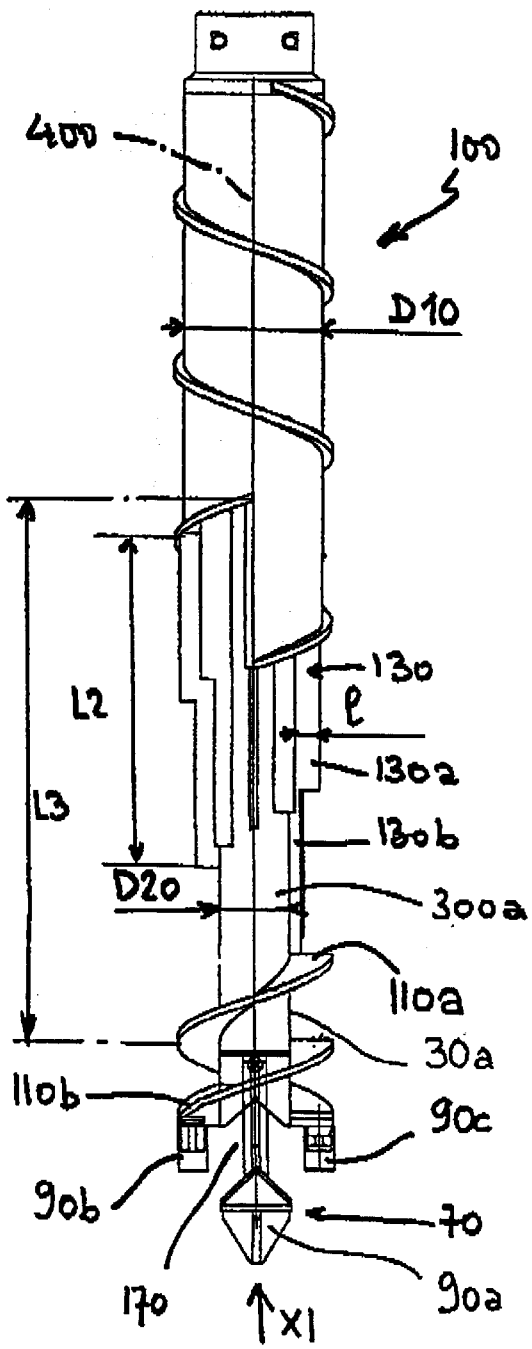
Figure 10:
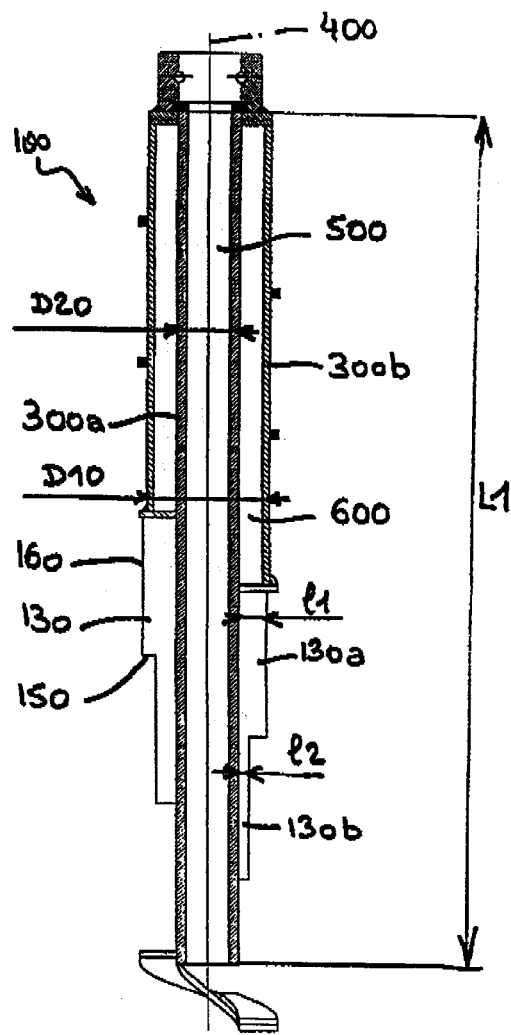
FIG. 10 is a longitudinal section of the core of the drill only, along the axis of the drill, but perpendicular the side views of FIGS. 8 and 9.

As illustrated, the drill 100 of the invention comprises a central cylindrical core 300 having a longitudinal axis 400 and an axial bore 500 (see FIG. 10). The bore (or hole) 500 is opened at its upper and lower ends. Preferably, the core 300 has an upper double-walled section comprising an inner cylindrical tube 300a coaxially surrounded by an outer cylindrical tube 300b, at a radial distance therefrom (space 600 on FIG. 10). The outer tube 300b extends from the upper end on about half the axis length L1 of the drill, while the inner tube 300a axially extends on all the length L. The external diameter D10 of the tube 300b is larger (for example twice larger) than the external diameter D20 of tube 300a. At the lower end, the drill has a drilling head 70 comprising a central drilling tip (or skid) 90a and two lateral teeth 90b, 90c, angularly shifted. The skid 90a is axially located, while the lateral teeth 90b, 90c are respectively fixed to an end of a first and a second screw flanges (respectively referenced 110a, 110b). Only one screw flange could be used. The screw flanges 110a, 110b are helices wound along the axis 400 and protruding from the lateral external surface 30a of the tube 300a (which is the only tube, there). On FIGS. 8 and 9, the screw flanges 110a, 110b are wound clockwise and, from the lower end of the core, they respectively have half-a-turn long, and one turn long. The screw flanges are angularly shifted (180°) with respect to one another. Possibly, the screw flange 110a could be as long as the auger head (see FIG. 13), but the pitch of both the screw flanges can be constant on their axial length. In FIG. 8, as far as half-a-turn from the upper end of the screw flange 10b, the outer convex surface 30a of the tube 300a is provided with a series 130 of blades adapted for destructuring the ground, or soil, round the auger head 100. Preferably, each blade of the series is planar and extends radial on the outer convex surface 30a, while defining a coaxial spiral round the lower section 300a of the core 300. The pitch of said spiral is preferably constant on the axial length thereof. Parallel to the axis 400, each blade has a length L2. Preferably, the length L2 is the same for every blade. Radial to the axis 400, every blade has a width l. As illustrated in FIGS. 8 to 11, the width of the blades increases in proportion of the distance between the concerned blade and the drilling head 70. The width of said blades preferably varies, from one blade of the series to another and (at least some of) the blades individually have a step 150 at their radial, external surface 160, so that the corresponding blades individually have an upper section 130a showing a width $l_1$ higher than the width $l_2$ of the lower section 130b, said lower section being located closer from the drilling head 7 than the upper section 130a.

Figure 11:
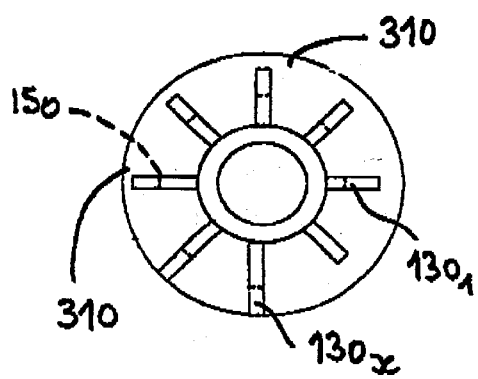
FIG. 11 is an axial view from above (arrow XI shown In FIG. 9) of the core of the drill, with no screw flange and no movable skid.
Figure 12:
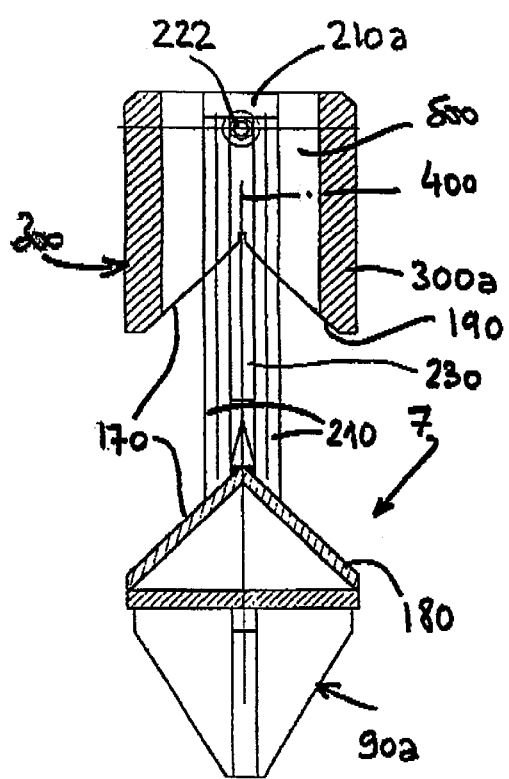
FIG. 12 is an enlarged section of the lower end of the same drill provided with the above-mentioned distal valve.

The width of such blades can be comprised between 20 mm and 350 mm, for a core having external diameters D10 comprised between 350 mm and 400 mm, and D20 comprised between 160 mm and 240 mm. The larger section of the blades can slightly laterally protrude from the external surface 30b of the upper tube 300b. The core and the blades are preferably made of metal and can be covered with an anti-abrasive layer. As illustrated in FIG. 9, the blades can individually have an axial length L2 comprised between 750 mm and 900 mm, the total axial length L1 of the drill 100 being comprised between 2,500 mm and 3,500 mm. Further, the spiral defined by the helically wound blades begins at about one pitch (one round) of the screw flange 110b from the tip 90a and can have an axial length L3 of about 900 mm (for the same total axial length L1 as above-mentioned) As shown in FIG. 11, the width of the blades progressively increases from the first one referenced $130_1$ (the closest from the lower end of the drill) to the last one (referenced $130_x$: longest distance from said lower end). Eight blades are illustrated. Seven of which have an external step 150 defining the above-mentioned lower and upper sections of a variable width. As an embodiment, every blade could be separated axially, so that for example fifteen independent helically wound blades would be provided having a progressively increasing width. However, blades as illustrated are cheaper and highly mechanically resistive. As illustrated in FIG. 8, an open space 310 is reserved between at least some of the blades and the upper side 110' of the longest screw flange 110a, so that the ground carried away by the screw flange(s) is decompacted in space 310, before being laterally pushed away by the blades. As shown in FIGS. 8 and 9, the skid 90a is an axially movable tip defining a valve 170 at the lower axial end 500a of the central bore 500. As illustrated in FIG. 12, the valve 170 comprises a double slope (V-shaped) roof 180 (defining an angulated, splayed out wall) which engages a double slope wall 190 of the tube 300a. To that end, the drilling skid 90a is axially movable along the axis 400 between an upper position (FIG. 8) in which the roof 180 of the skid 90a engages the terminal, angulated, splayed out wall 190 of the tube 300a, for closing the lower end of the bore 500, so that any soil or ground is prevented from entering the duct 500 when the drill is forced into the ground, and a lower position (FIGS. 9 and 12) in which the drill (tube 300a) and the central skid 90a (valve 170) are axially spaced, so that any concrete injected through the duct 500 from its upper end can flow into the drilled hole. To that end, twin bars (one of which is illustrated in FIG. 12 and referenced 210) are fixed to the roof 180. Each of said twin bars is U-shaped for showing a transversal upper section 210a engaging a transversal stop 222 laterally fixed to the inner wall of the tube 300a, within the duct 500.

The axial clearance of the stop 210 within the groove 230 defined by each twin bars is tight, so that an axially guided translation is obtained, even if the moving head 90a can tilt round the transversal stop bar 222 during the opening of the valve. Such a conformation of the lower end of the drill defines an efficient skid, preventing the valve skid from being separated from the drill when said drill is extracted, (what typically increases the global cost of the drilling). Further, the above-mentioned mechanical engagement between the skid and the core (when they are in their closing position corresponding to the upper position of the skid, as illustrated in FIG. 8) allows the core to efficiently transfer a torque to the skid 90a, when said core is rotated.

Figure 13:
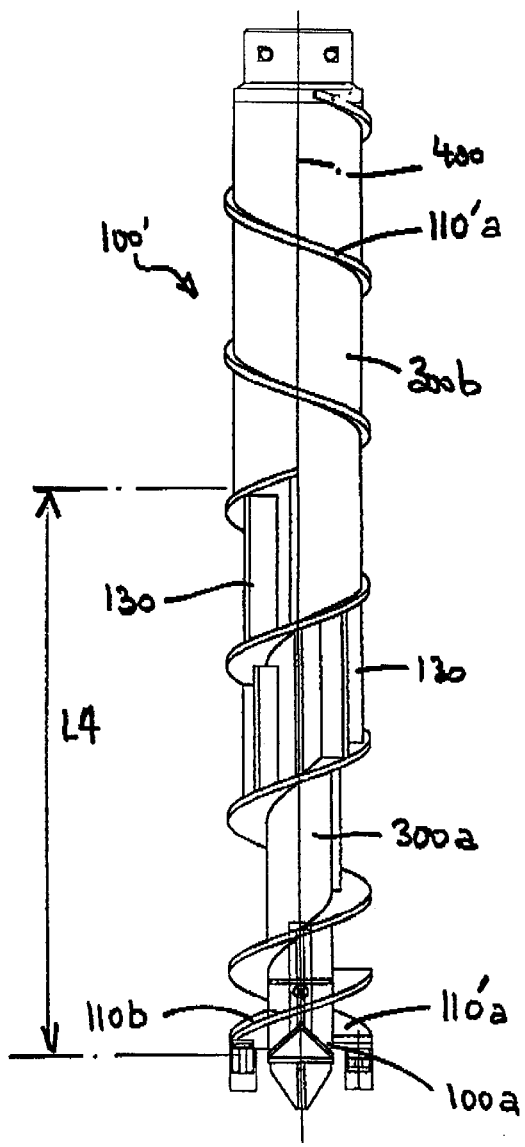
FIG. 13 is a side view of an embodiment of the above drill now provided with an external helix all along its axial length (same scale as FIGS. 8 and 9).

The embodiment of FIG. 13 shows that a screw flange 110'a can protrude from both the inner tube 300a (along the lower section of the drill) and the outer tube 300b (along the upper section of the drill). The screw flange protrudes less from the external surface of the outer tube 300b than from the inner tube 300a. Along the axial length L4 where the inner tube 300a is visible from outside, at the lower section of the drill, the drill is provided with the above-mentioned blades 130 for destructuring (crushing) the ground surrounding the drill. These blades 130 individually have a length parallel to the core axis 400 and extend along said length, between two adjacent (successive) turns of the screw flange, so that they define an axial spiral. They are preferably angularly regularly disposed round the drill. The spiral of the blades begins at an axial distance from the lower end 100a of the illustrated drill 100' and ends (for example) one turn and a half further, at a location immediately adjacent the outer tube 300b (but the axial length of the wound blades could be extended towards the upper end of the drill).

What is claimed is:

1. A device for reinforcing a ground having a Young's modulus less than 9 MPa, on which is disposed a loading structure, the device comprising:

a series of structural inclusions disposed essentially vertically within the ground and adapted to mechanically reinforce said ground, the series of inclusions having a dimension D comprised between substantially 0.2 m and 0.6 m, said dimension D being selected from the group consisting of:

an external diameter of one inclusion of said series, and an external diameter of a cylinder having the same volume as one inclusion of said series, two adjacent inclusions being separated in the ground by a distance (A) such that $2D \leq A \leq 10\,D$, said series of inclusions being made of a semi-rigid material which is comprised of aggregates of stones or a mortar or a concrete and which has a long term Young's modulus comprised between 500 and 10,000 MPa, a load transmitting layer interposed between the ground and the loading structure disposed thereon, for transmitting and distributing the load from the loading structure to both the ground and the series of inclusions, the load transmitting layer being adapted to be partially penetrated by the series of inclusions and having:

a Young's modulus less than the Young's modulus of the series of inclusions, a first nominal height between two adjacent inclusions of said series of inclusions, and, a second height less than the first nominal height at locations situated just above the series of inclusions, where the load transmitting layer is plastically compressed by the series of inclusions which partially penetrate within said load transmitting layer.

2. A device for reinforcing a ground on which is disposed a loading structure, wherein the device comprises:

a series of structural inclusions disposed within the ground and adapted to mechanically reinforce said ground, said series of inclusions being made of a semi-rigid material which is comprised of aggregates of stones or a mortar or a concrete, a load transmitting layer interposed between the ground and the loading structure disposed thereon, for transmitting and distributing the load from the loading structure to both the ground and the series of inclusions, the load transmitting layer having a Young's modulus less than the Young's modulus of the series of inclusions, and being adapted to be partially penetrated by the series of inclusions, and wherein:

(D) being the external diameter of a cylinder having the same volume as one inclusion of said series which support the load of the loading structure, (A) being the length of one side of a square equivalent to the distance between two adjacent inclusions in the ground, ($E_i$) being the Young's modulus of the inclusions, and ($E_c$) being the Young's modulus of the load transmitting layer:

$0.1\,m \leq D \leq 0.8\,m$ $2D \leq A \leq 10\,D$, and if $D \leq 0.3$ m, then $5{,}000\,\text{MPa} \leq E_i \leq 12{,}000\,\text{MPa}$, if $D \leq 0.3$ m, then $500\,\text{MPa} \leq E_i \leq 10{,}000\,\text{MPa}$, and $E_c \leq 80\,\text{MPa}$.

* * * * *